United States Patent
Ikeda

(10) Patent No.: US 9,118,834 B2
(45) Date of Patent: Aug. 25, 2015

(54) IMAGING APPARATUS

(75) Inventor: Hitoshi Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/605,466

(22) Filed: Sep. 6, 2012

(65) Prior Publication Data

US 2012/0327275 A1 Dec. 27, 2012

Related U.S. Application Data

(63) Continuation of application No. 12/797,519, filed on Jun. 9, 2010, now Pat. No. 8,310,564.

(30) Foreign Application Priority Data

Jun. 15, 2009 (JP) ................................ 2009-141881

(51) Int. Cl.
G02B 13/16 (2006.01)
H04N 5/225 (2006.01)
H04N 5/232 (2006.01)
G03B 17/18 (2006.01)

(52) U.S. Cl.
CPC ............ H04N 5/23293 (2013.01); G03B 17/18 (2013.01); H04N 5/23219 (2013.01); H04N 5/23245 (2013.01); H04N 5/23296 (2013.01)

(58) Field of Classification Search
USPC ......... 348/335, 340, 345, 348, 349, 350, 352, 348/333.01–333.05, 348.35
IPC ......................................................... G03B 17/18
See application file for complete search history.

(56) References Cited

U.S. PATENT DOCUMENTS 6,697,105 B1 * 2/2004 Kato et al. ................. 348/211.6
2005/0083426 A1 * 4/2005 Yoo et al. ................. 348/333.05

FOREIGN PATENT DOCUMENTS

JP 2006-014221 A 1/2006
JP 2006-197055 A 7/2006

* cited by examiner

*Primary Examiner* — Yogesh Aggarwal
(74) *Attorney, Agent, or Firm* — Canon USA, Inc. IP Division

(57) ABSTRACT

An apparatus includes a control unit which switches between a first display mode and a second display mode based on whether a zoom state is equal to or greater than a predetermined zoom magnification. The imaging apparatus, in a zoom state where a part of an imaging area is clipped and recorded, switches between the first display mode, which displays on a display unit a clipped recording area, and the second display mode, which displays on the display unit an area which is wider than the clipped recording area.

10 Claims, 7 Drawing Sheets

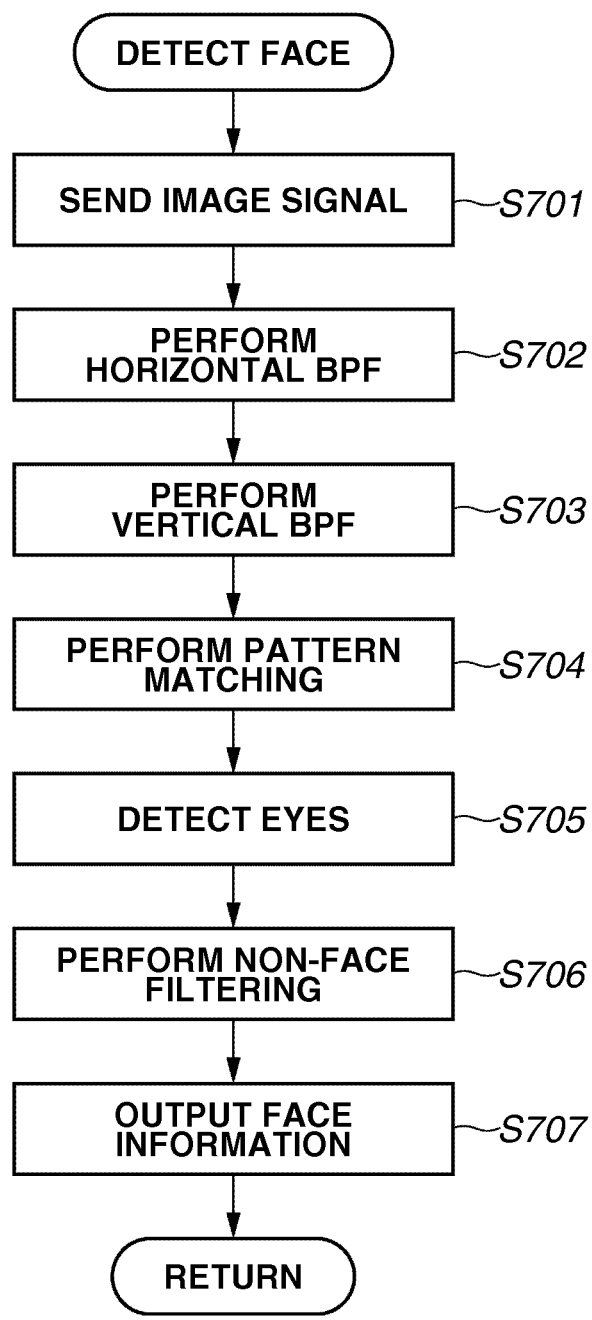

IMAGING APPARATUS

CROSS-REFERENCE TO RELATED APPLICATION

This application is a Continuation of U.S. application Ser. No. 12/797,519, filed Jun. 9, 2010, which claims priority from Japanese Patent Application No. 2009-141881 filed Jun. 15, 2009, which are hereby incorporated by reference herein in their entireties.

BACKGROUND OF THE INVENTION

1. Field of the Invention

The present invention relates to an imaging apparatus capable of framing while displaying an area which is wider than a recording area.

2. Description of the Related Art

Conventionally, in a digital camera, still images captured at a user's desired timing are sequentially recorded on a memory card or the like while an image formed on an image sensor is displayed on a display screen of viewfinder provided on the camera body.

Many digital cameras have an optical zoom function which zooms in or zooms out a photographing range of an object to a magnification while controlling a lens system in an optical block based on an operation from the user. Further, many digital cameras have an electronic zoom function for performing predetermined image processing on a part of an image formed on the image sensor to perform interpolation and enlargement processing.

When the user captures an image using the electronic zoom function, a still object can be easily captured in the photographing range even by zooming in at a magnification. However, when zooming in on an object which is moving comparatively quickly, such as an object at an athletics meet or a sports match, it is difficult to constantly track the object so as to capture it in the photographing range.

Concerning this point, Japanese Patent Application Laid-Open No. 2006-14221 discusses a technique (hereinafter, "wide view") in which a peripheral portion of an image to be recorded is also simultaneously displayed on a viewfinder display screen by using, of the light receiving area of the image sensor, the peripheral portion that is not used in the recording of the image, during electronic zooming.

However, the technique discussed in Japanese Patent Application Laid-Open No. 2006-14221 performs wide view display based on an instruction from the user. This technique does not consider the coordination with the zoom operation as regards switching to the wide view. Therefore, this technique has the drawback, e.g., to perform the troublesome operations of switching to the wide view after a zoom in operation, and canceling the wide view after a zoom out operation.

SUMMARY OF THE INVENTION

According to an aspect of the present invention, an apparatus includes an imaging unit configured to capture an image of an object, a display unit configured to display the captured image, and a control unit having two display modes in a zoom state where a part of an imaging area is clipped and recorded, wherein a first display mode displays on the display unit a clipped recording area and a second display mode displays on the display unit an area wider than the clipped recording area. The display control unit is configured to switch to the first display mode when a zoom magnification is less than a predetermined zoom magnification and switch to the second display mode when the zoom magnification is equal to or greater than the predetermined zoom magnification.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating operations during face detection according to the second exemplary embodiment.

DESCRIPTION OF THE EMBODIMENTS

Various exemplary embodiments, features, and aspects of the invention will be described in detail below with reference to the drawings.

The present invention will now be described in detail based on the following first and second exemplary embodiments.

Figure 1:
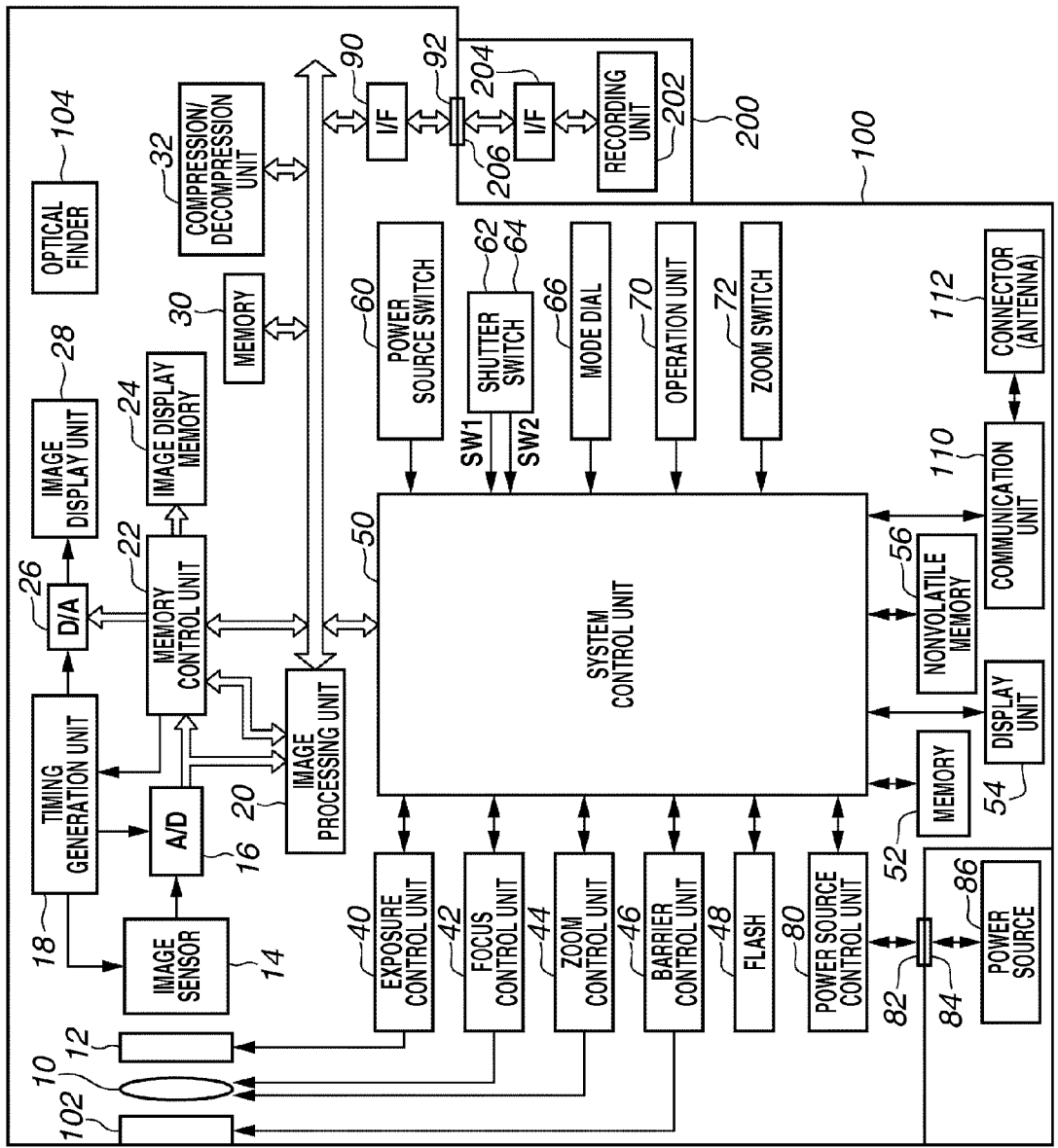
FIG. 1 is a block diagram illustrating a configuration of an imaging apparatus according to a first and a second exemplary embodiment of the present invention.

FIG. 1 is a block diagram illustrating a configuration of an imaging apparatus according to a first exemplary embodiment of the present invention. In FIG. 1, an imaging apparatus 100 includes a photographic lens 10, a shutter 12 having a diaphragm function, an image sensor 14, an analog/digital (A/D) converter 16, and a timing generation unit 18 for supplying a clock signal and a control signal to the image sensor 14, the A/D converter 16, and a digital/analog (D/A) converter 26. These components are controlled by a below-described memory control unit 22 and a system control unit 50.

An image processing unit 20 performs predetermined pixel interpolation processing and color conversion processing on data from the A/D converter 16 or data from the memory control unit 22. The image processing unit 20 also realizes the electronic zoom function by clipping the image and performing magnification processing. In the image processing unit 20, predetermined calculation processing is performed using captured image data. Based on the obtained calculation result, the system control unit 50 performs the following processing on an exposure control unit 40 and a focus control unit 42. More specifically, the system control unit 50 performs through-the-lens (TTL) type auto focus (AF) processing, auto exposure (AE) processing, auto white balance (AWB) processing, and flash pre-exposure (EF) processing.

The memory control unit 22 controls the A/D converter 16, the timing generation unit 18, the image processing unit 20, an image display memory 24, the D/A converter 26, a memory 30, and a compression/decompression unit 32. Data from the A/D converter 16 is written in the below-described image display memory 24 or the memory 30 via the image processing unit 20 and the memory control unit 22, or directly via the memory control unit 22.

Image data for display which was written in the image display memory 24 is displayed by an image display unit 28 via the D/A converter 26. This image display unit 28 is formed of a thin-film transistor (TFT) liquid crystal display (LCD) and the like. An electronic viewfinder function can be realized using the image display unit 28 by sequentially displaying captured image data. The image display unit 28 can arbitrarily turn the display ON and OFF based on an instruction from the system control unit 50. When the display is turned OFF, power consumption of the imaging apparatus 100 can be dramatically reduced.

The memory 30 is used for storing captured still images and moving images. This memory 30 can also be used as a working area of the system control unit 50. The compression/decompression unit 32 compresses and decompresses image data by adaptive discrete cosine transform (ADCT), wavelet transformation and the like. The compression/decompression unit 32 reads an image stored in the memory 30, performs compression processing or decompression processing, and writes the processed data in the memory 30. The exposure control unit 40 controls the shutter 12 which has a diaphragm function. The focus control unit 42 controls the focusing of the photographic lens 10. A zoom control unit 44 controls optical zooming of the photographic lens 10. A barrier control unit 46 controls the operation of a protection member 102, which is a barrier. A flash unit 48 has an AF auxiliary light projection function and a flash light amount control function.

The system control unit 50 controls the whole imaging apparatus 100. A memory 52 stores constants, variables, programs and the like for operation of the system control unit 50. A display unit 54 is a liquid crystal display device or the like which displays an operation state, messages and the like using characters and images based on execution of a program by system control unit 50. One or a plurality of display units 54 is/are arranged at a location or locations which can be easily viewed around the operation unit of the imaging apparatus 100. The display unit 54 is configured by a combination of LCDs, light emitting diodes (LED) and the like, for example. Further, some of the functions of the display unit 54 are provided in the optical finder 104.

A nonvolatile memory 56 is capable of electrically recording or deleting data. An electrically erasable programmable read-only memory (EEPROM), for example, may be used as the nonvolatile memory 56. A power source switch (main switch) 60, a switch (SW1) 62, a switch (SW2) 64, a mode dial 66, an operation unit 70, and a zoom switch 72 are operation parts for inputting various operation instructions for the system control unit 50. These parts are configured of a single or a combination of a plurality of switches, dials, touch panels, pointing systems based on visual detection, voice recognition devices and the like.

The operation unit 70 has an electronic tele converter setting button. The zoom switch 72 is configured of a tele switch for zooming an imaging angle of view to a telephoto side and a wide switch for zooming the imaging angle of view to a wide angle side. Using this zoom switch 72, the user instructs the zoom control unit 44 to zoom the photographic lens 10 to perform an optical zoom operation. Further, the user also uses the zoom control unit 44 to perform an electronic zoom operation in which the image processing unit 20 clips the image and performs magnification processing.

The imaging apparatus 100 also includes a power source control unit 80, connectors 82 and 84, and a power source 86 configured of various primary batteries, secondary batteries 86, an alternating current (AC) adapter and the like. Further, the imaging apparatus 100 includes an interface 90 with a recording medium such as a memory card and a hard disk, and a connector 92.

The protection member 102 is a barrier which prevents soiling and damage by covering the imaging unit including the photographic lens 10 of the imaging apparatus 100. An optical finder 104 can be used to perform imaging by itself without using an electronic viewfinder function by the image display unit 28.

A communication unit 110 has various communication functions such as a recommended standard (RS) 232, a universal serial bus (USB), an Institute of Electrical and Electronics Engineers (IEEE) 1394, a parallel (P) 1284, a small computer system interface (SCSI), a modem, a local area network (LAN), wireless communication and the like. The imaging apparatus 100 also includes a connector 112 for connecting with other devices via the communication unit 110. For wireless communication, this connector 112 is an antenna.

A recording medium 200 is a memory card, a hard disk and the like. This recording medium 200 includes a recording unit 202 configured from a semiconductor memory, magnetic disk and the like, an interface 204 with the imaging apparatus 100, and a connector 206 for connecting with the imaging apparatus 100.

Next, the operations of the main parts according to the first exemplary embodiment of the present invention will be described with reference to FIGS. 2 to 5.

Figure 2:
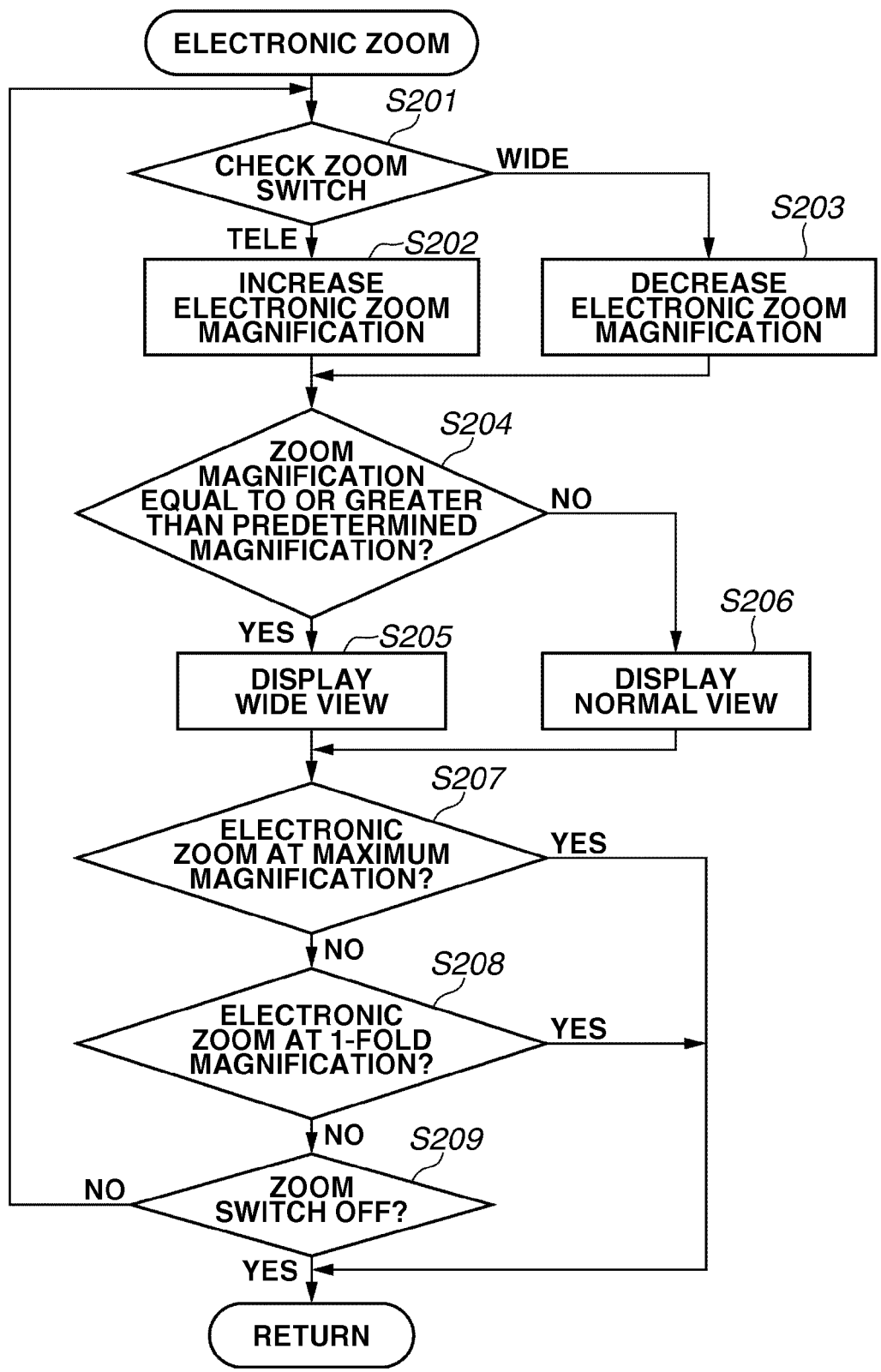
FIG. 2 is a flowchart illustrating operations during electronic zooming according to the first exemplary embodiment.
Figure 3A:
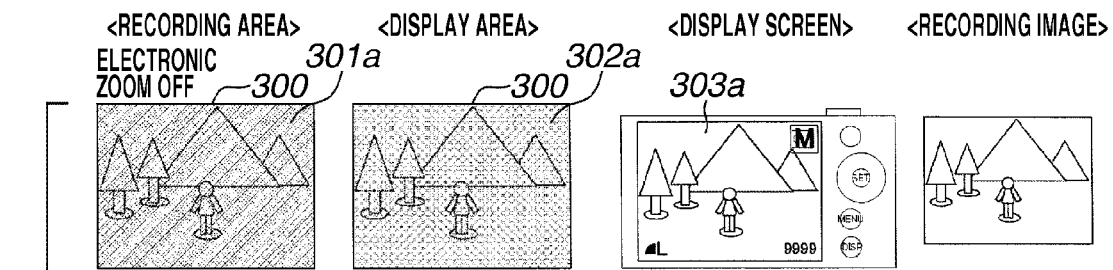
FIG. 3 illustrates recording areas, display areas and the like during electronic zooming according to the first exemplary embodiment.
Figure 3B:
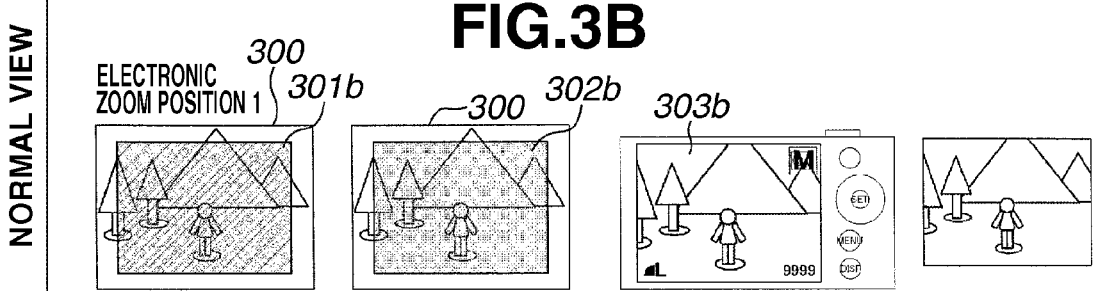
Figure 3C:
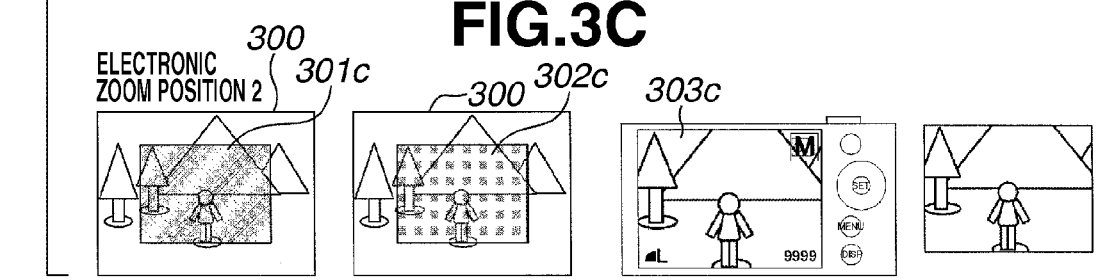
Figure 3D:
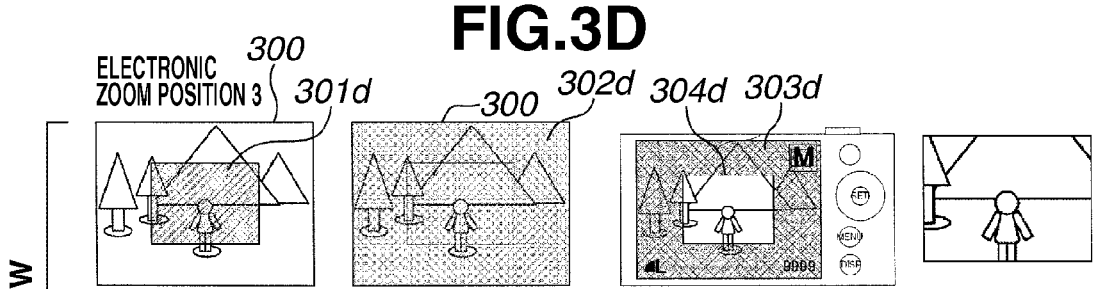
Figure 3E:
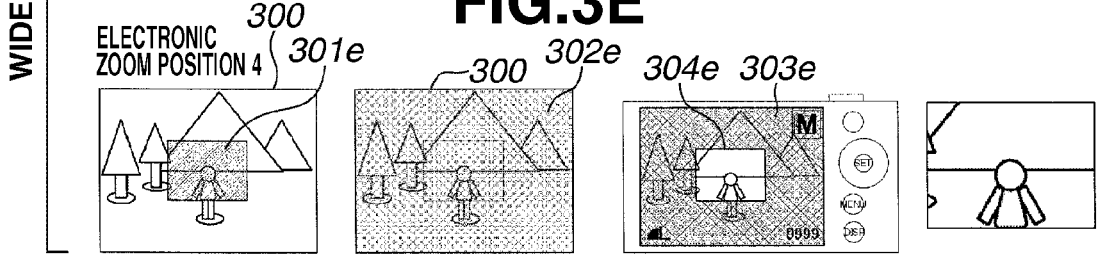

FIG. 2 is a flowchart illustrating operations during electronic zooming by the imaging apparatus 100 according to the first exemplary embodiment.

When the zoom switch 72 is operated, the system control unit 50 starts electronic zoom processing. In electronic zooming, a part of the area in the image formed on the image sensor 14 is clipped by the image processing unit 20, and enlargement processing is performed by pixel interpolation and the like, or reduction processing is performed by thinning and the like. Then, compression is performed using the compression/decompression unit 32, and the compressed data is recorded in the recording unit 202 in the recording medium 200 as a still image so that a zoom effect is obtained. Further, based on operation of the zoom switch 72, the recording angle of view is changed by increasing or decreasing the area clipped from the image formed on the image sensor 14 using the image processing unit 20. An imaging apparatus is capable of easily framing a rapidly moving object at that stage regardless of the zoom magnification without any troublesome operations by controlling the electronic viewfinder display of the image display unit 28 in the following manner.

In FIG. 2, first, in step S201, the system control unit 50 checks the state of the zoom switch 72, and if the tele switch is ON, the processing proceeds to step S202. In step S202, the angle of view is changed to the telephoto side by reducing the recording area, in other words, the clipped area of the image by the image processing unit 20 during recording, and increasing the electronic zoom magnification. On the other hand, if the wide switch is ON, the processing proceeds to step S203. In step S203, the angle of view is changed to the wide angle side by increasing the recording area, in other words, the clipped area of the image by the image processing unit 20 during, recording and decreasing the electronic zoom magnification.

Next, in step S204, the system control unit 50 determines whether the zoom magnification is equal to or greater than a predetermined magnification, for example, twice the electronic zoom magnification. The predetermined magnification may be set at an appropriate magnification which makes framing easy at any zoom magnification. Further, the term "zoom magnification" as used here may be the electronic zoom magnification only, or may be a magnification which combines the optical zoom and the electronic zoom. If it is determined that the zoom magnification is equal to or greater than a predetermined magnification (YES in step S204), the processing proceeds to step S205, and wide view display is performed. In wide view display, not only the recording area which is a part of the image formed on the image sensor 14, but the peripheral portion of that image is also displayed on the image display unit 28. More specifically, the display area displayed on the image display unit 28 is set to a wider area than the recording area.

If only the recording area is displayed when the zoom magnification is increased, the object tends to be lost from view in the screen, and framing becomes difficult. Therefore, by setting to a wide view display which displays a wider area including the recording area when the zoom magnification is equal to or greater than the predetermined magnification, it becomes comparatively easy to track a rapidly moving object, so that it can be captured in the photographing range regardless of the zoom magnification. Further, a frame or the like indicating the recording area is displayed on the image display unit 28 so that the user can recognize the recording area.

Further, if it is determined in step S204 that the zoom magnification is not equal to or greater than the predetermined magnification (NO in step S204), the processing proceeds to step S206. In step S206, the system control unit 50 performs normal view display. In normal view display, only the recording area which is a part of the image formed on the image sensor 14 is displayed on the image display unit 28. More specifically, the display area displayed on the image display unit 28 is set to be the same area as the recording area.

Thus, an easily framed display can be performed without any troublesome operations.

Next, in step S207, the system control unit 50 determines whether the electronic zoom is at a maximum magnification. If it is determined that the electronic zoom is at a maximum magnification (YES in step S207), the system control unit 50 finishes the electronic zoom processing. If it is determined that the electronic zoom is not at a maximum magnification (NO in step S207), the processing proceeds to step S208. In step S208, the system control unit 50 determines whether the electronic zoom is at one-fold magnification, in other words, whether no electronic zooming is performed. If it is determined that the electronic zoom is at one-fold magnification (YES in step S208), the system control unit 50 finishes the electronic zoom processing.

If it is determined in step S208 that the electronic zoom is not at one-fold magnification (NO in step S208), the processing proceeds to step S209. In step S209, the system control unit 50 checks the state of the zoom switch 72. If it is determined that the zoom switch 72 is OFF (YES in step S209), the system control unit 50 finishes the electronic zoom processing. If it is determined that the zoom switch 72 is ON (NO in step S209), the processing returns to step S201, and the same operations are repeated.

FIG. 3 illustrates examples of recording areas, display areas, display screens, and recording images in wide view display (step S205) and normal view display (step S206) during electronic zooming.

In FIG. 3, an imaging area 300 of the image sensor 14 includes recording areas 301a to 301e at electronic zoom positions (a) to (e), display areas 302a to 302e at electronic zoom positions (a) to (e), display screen examples 303a to 303e at electronic zoom positions (a) to (e), and frames 304d and 304e at electronic zoom positions (d) and (e). Recording area 301a, display area 302a, and display screen 303a are illustrated for a case in which the electronic zoom is off. Recording areas 301b to 301e, display areas 302b to 302e, and display screens 303b to 303e are illustrated for cases in which the electronic zoom is at electronic zoom positions 1 to 4, respectively. Frames 304d and 304e indicate a recording range at electronic zoom positions (d) and (e), respectively. In the example of FIG. 3, a normal view is illustrated at electronic zoom positions (a), (b) and (c), and a wide view is illustrated at electronic zoom positions (d) and (e).

As the electronic zoom magnification increases from (a) to (e), the recording areas 301a to 301e become smaller with respect to the imaging area 300 of the image sensor 14. On the other hand, the display areas 302a to 302c in the normal view each have the same area as the recording areas 301a to 301c. However, the display areas 302d and 302e in the wide view each have a wider area than the recording areas 301d and 301e when the zoom magnification is equal to or greater than the predetermined magnification.

More specifically, in normal view, like display screens 303a to 303c, the recording area is displayed on the whole screen of the image display unit 28, and in wide view, like display screens 303d and 303e, the peripheral portion of the recording area is also simultaneously displayed on the image display unit 28. Further, in wide view, frames 304d and 304e indicating the recording area in the display area are displayed.

Electronic tele conversion is a mode which enables an optical zoom operation while maintaining the constant electronic zoom magnification, namely, while maintaining the constant area of the image to be cropped and recorded. In tele conversion, an effect similar to a case where a teleconverter is mounted on an optical lens can be obtained.

Figure 4:
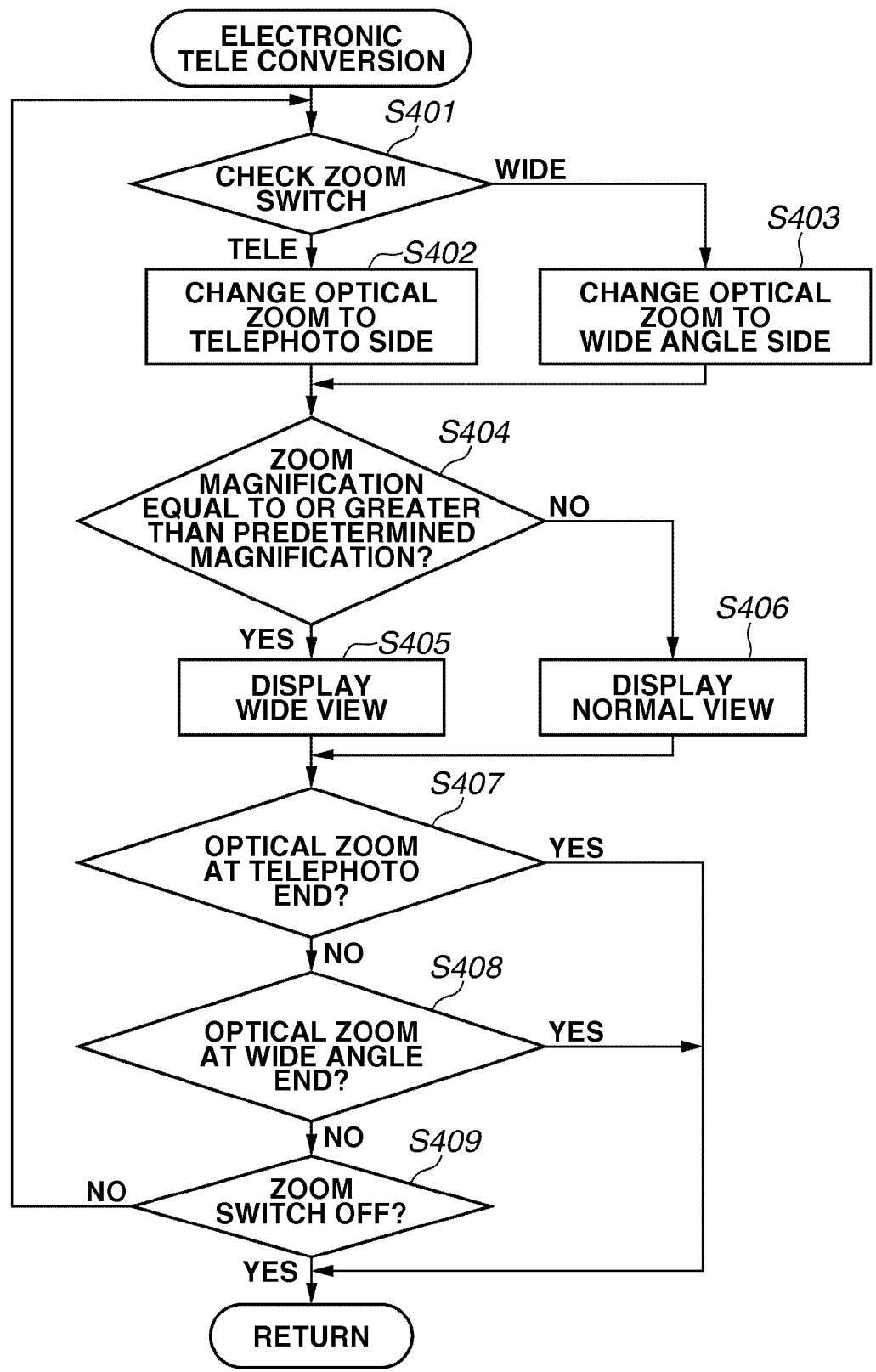
FIG. 4 is a flowchart illustrating operations during electronic tele conversion according to the first exemplary embodiment.
Figure 5A:
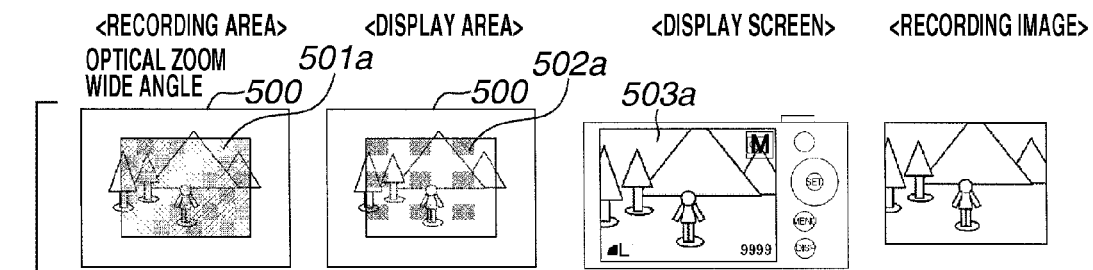
FIG. 5 illustrates recording areas, display areas and the like during electronic tele conversion according to the first exemplary embodiment.
Figure 5B:
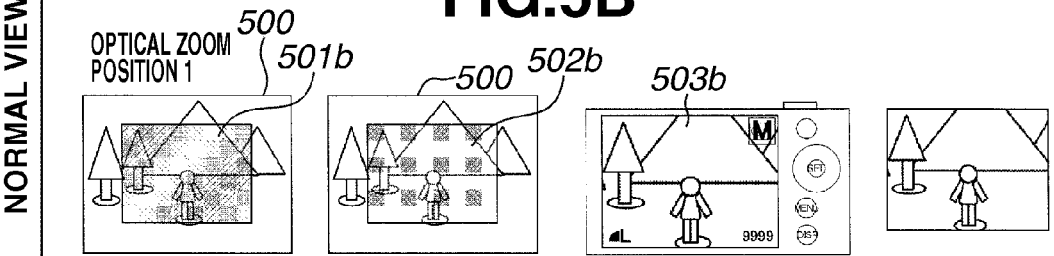
Figure 5C:
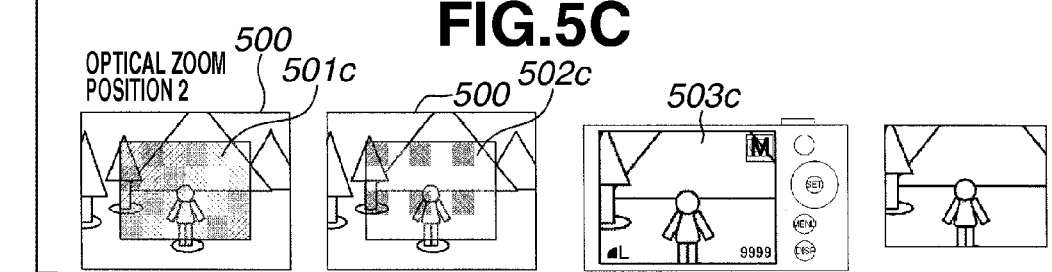
Figure 5D:
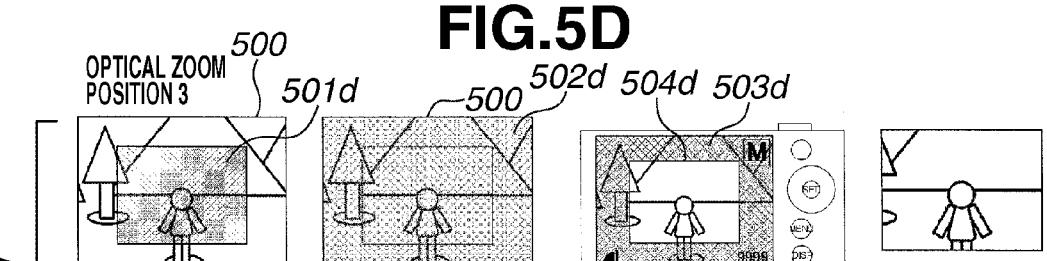
Figure 5E:
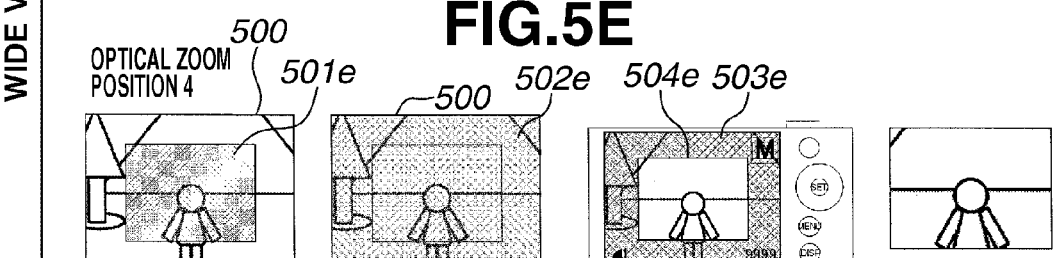

FIG. 4 is a flowchart illustrating operations during electronic tele conversion by the imaging apparatus 100 according to the first exemplary embodiment.

Based on an electronic tele conversion setting instruction from an electronic tele conversion setting button (not-illustrated) of the operation unit 70 or a menu operation, the system control unit 50 sets the imaging apparatus 100 to an electronic tele conversion state. In electronic tele conversion, similar to electronic zooming, a part of the area in the image formed on the image sensor 14 is clipped by the image processing unit 20, and enlargement processing by pixel interpolation and the like or reduction processing by thinning and the like is performed. Then, compression is performed using the compression/decompression unit 32, and the compressed data is recorded in the recording unit 202 as a still image so that a zoom effect similar to a case where a teleconverter is mounted on the photographic lens 10 is obtained. Further, based on operation of the zoom switch 72, the recording angle of view can be changed by performing optical zooming to change the imaging angle of view of the photographic lens 10 by the zoom control unit 44. An imaging apparatus is capable of easily framing at that stage a rapidly moving object regardless of the zoom magnification without any troublesome operations by controlling the electronic viewfinder display of the image display unit 28 in the following manner.

In FIG. 4, when a zoom switch 72 operation to change the optical zoom magnification is performed, the system control unit 50 starts zoom processing in an electronic tele conversion state. First, in step S401, the system control unit 50 checks the state of the zoom switch 72, and if the tele switch is ON, the processing proceeds to step S402. In step S402, the system control unit 50 instructs the zoom control unit 44 to change the imaging angle of view of the photographic lens 10 to the telephoto side to increase the optical zoom magnification. On the other hand, if the wide switch is ON, the processing proceeds from step S401 to step S403. In step S403, the system control unit 50 instructs the zoom control unit 44 to change the imaging angle of view of the photographic lens 10 to the wide angle side to decrease the optical zoom magnification.

Next, in step S404, the system control unit 50 determines whether the zoom magnification is equal to or greater than a predetermined magnification. The term "zoom magnification" as used here may be the optical zoom magnification only, or may be the actual magnification (optical zoom magnification×electronic tele conversion magnification) obtained by multiplying the electronic tele conversion magnification by the optical zoom magnification. For example, if the optical zoom is 4-fold magnification, and the electronic tele conversion is 2-fold magnification, the actual magnification is 8-fold magnification. If it is determined that the zoom magnification is equal to or greater than the predetermined magnification (YES in step S404), the processing proceeds to step S405, and wide view display is performed. In wide view display, not only the recording area which is a part of the image formed on the image sensor 14, but the peripheral portion of that image is also displayed on the image display unit 28. More specifically, the display area displayed on the image display unit 28 is set to a wider area than the recording area.

By thus setting to a wide view display, it becomes comparatively easy to track a rapidly moving object, so that it can be captured in the photographing range. Further, a frame indicating the recording area is displayed on the display unit 54 so that the user can recognize the recording area.

Further, if it is determined in step S404 that the zoom magnification is not equal to or greater than the predetermined magnification (NO in step S404), the processing proceeds to step S406. In step S406, the system control unit 50 performs normal view display. In normal view display, only the recording area which is a part of the image formed on the image sensor 14 is displayed on the display unit 54. More specifically, the display area displayed on the display unit 54 is set to be the same area as the recording area.

By processing in the above manner, an easily framed display can be performed without any troublesome operations.

Next, in step S407, the system control unit 50 determines whether the optical zoom is at the telephoto end. If it is determined that the optical zoom is at the telephoto end (YES in step S407), the system control unit 50 finishes the zoom processing in an electronic tele conversion state. If it is determined that the optical zoom is not at the telephoto end (NO in step S407), the processing proceeds to step S408. In step S408, the system control unit 50 determines whether the optical zoom is at the wide angle end. If it is determined that the optical zoom is at the wide angle end (YES in step S408), the system control unit 50 finishes the zoom processing in an electronic tele conversion state.

Further, if it is determined in step S408 that the optical zoom is not at the wide angle end (NO in step S408), the processing proceeds to step S409. In step S409, the system control unit 50 checks the state of the zoom switch 72. If it is determined that the zoom switch 72 is OFF (YES in step S409), the system control unit 50 finishes the zoom processing in an electronic tele conversion state. If it is determined that the zoom switch 72 is ON (NO in step S409), the processing returns to step S401, and the same operations are repeated.

FIG. 5 illustrates examples of recording areas, display areas, display screens, and recording images in wide view display (step S405) and normal view display (step S406) during electronic tele conversion.

In FIG. 5, an imaging area 500 of the image sensor 14 includes recording areas 501*a* to 501*e* at optical zoom positions (a) to (e), display areas 502*a* to 502*e* at optical zoom positions (a) to (e), display screen examples 503*a* to 503*e* at optical zoom positions (a) to (e), and frames 504*d* and 504*e* at optical zoom positions (d) and (e). Recording area 501*a*, display area 502*a*, and display screen 505*a* are illustrated for a case in which the optical zoom is at the wide angle end. Recording areas 501*b* to 501*e*, display areas 502*b* to 502*e*, and display screens 503*b* to 503*e* are illustrated for cases in which the optical zoom is at optical zoom positions 1 to 4, respectively. Frames 504*d* and 504*e* indicate a recording range at optical zoom positions (d) and (e), respectively. In the example of FIG. 5, a normal view is illustrated at optical zoom positions (a), (b) and (c), and a wide view is illustrated at optical zoom positions (d) and (e).

In contrast to electronic zooming, in the electronic tele conversion, even when the optical zoom magnification increases from (a) to (e), the recording areas 501*a* to 501*e* are constant with respect to the imaging area 500 of the image sensor 14. The display areas 502*a* to 502*c* in the normal view have the same area as the recording areas 501*a* to 501*c*. However, the display areas 502*d* and 502*e* in the wide view, in which the zoom magnification is equal to or greater than the predetermined magnification, have a wider area than the recording areas 501*d* and 501*e*.

More specifically, in normal view, like display screens 503*a* to 503*c*, the recording area is displayed on the whole screen of the image display unit 28, and in wide view, like display screens 503*d* and 503*e*, the peripheral portion of the recording area is also simultaneously displayed on the image display unit 28. Further, in wide view, frames 504*d* and 504*e* indicating the recording area in the display area are displayed.

The imaging apparatus according to the above-described first exemplary embodiment has a first mode (normal view) in which the same area as a clipped recording area is displayed on the image display unit 28 as a display area in an electronic zoom state or an electronic tele conversion state which records by clipping a part of the imaging area. Further, this imaging apparatus has a second mode (wide view) in which an area wider than the clipped recording area is displayed on the image display unit 28 as the display area. In addition, the imaging apparatus according to the first exemplary embodiment switches between the first and second display modes based on whether the zoom magnification is equal to or greater than a predetermined zoom magnification (predetermined magnification). More specifically, when the zoom magnification is at a high magnification which is equal to or greater than the predetermined zoom magnification, the imaging apparatus switches to the second mode (wide view), and when the zoom magnification is at a low magnification which is less than the predetermined zoom magnification, the imaging apparatus cancels the wide view and switches to the first mode (normal view).

Therefore, an easy-to-use imaging apparatus can be provided which is capable of performing an easily framed display regardless of zoom magnification without any troublesome operations.

Next, the operations of the main parts of an imaging apparatus according to a second exemplary embodiment of the present invention will be described using the flowcharts of FIGS. 6 and 7. The configuration of the imaging apparatus is the same as in FIG. 1, and thus a detailed description thereof will be omitted here.

Figure 6:
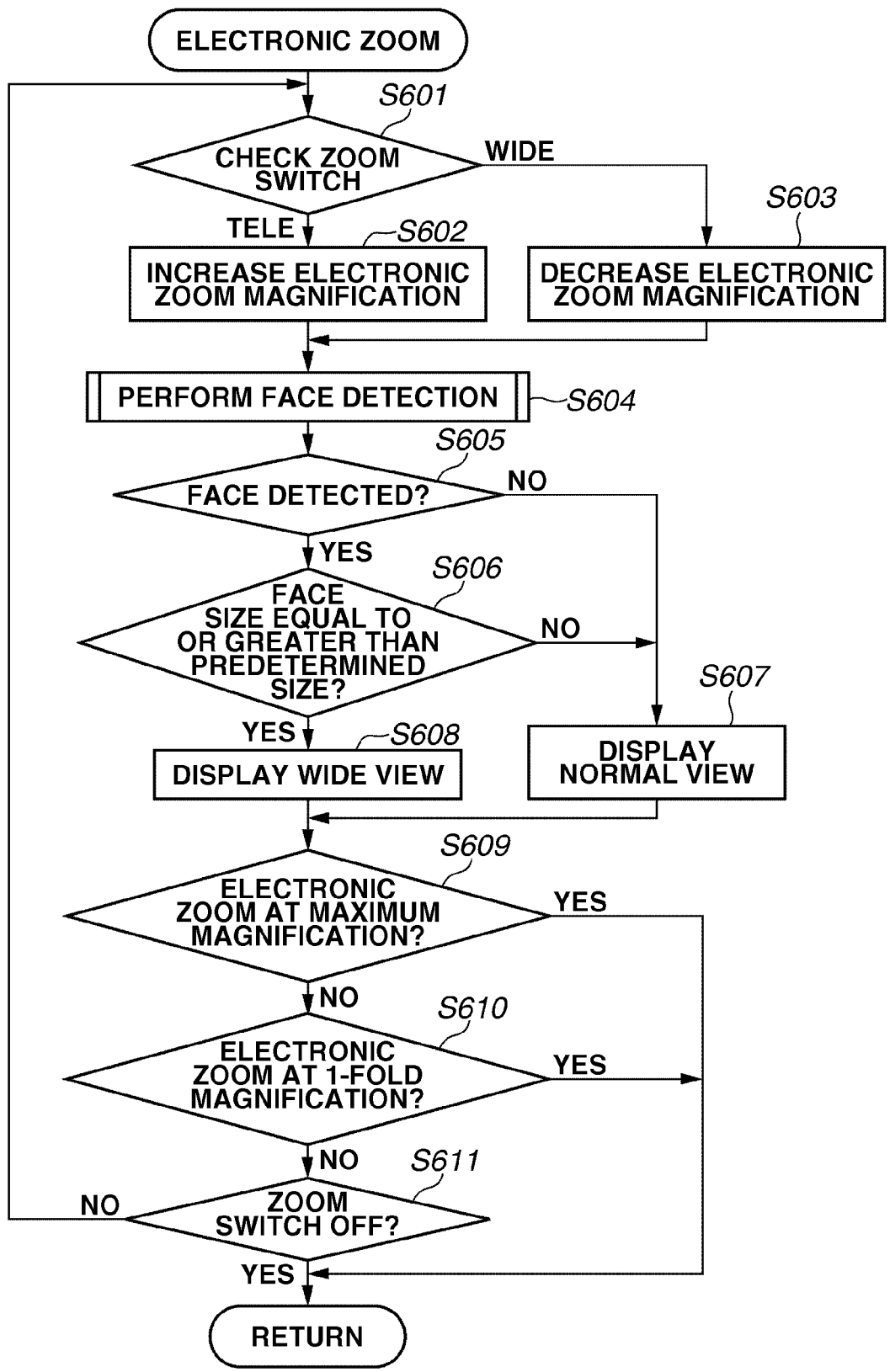
FIG. 6 is a flowchart illustrating operations during electronic zooming according to the second exemplary embodiment.

FIG. 6 is a flowchart illustrating operations during electronic zooming by the imaging apparatus 100 according to the second exemplary embodiment.

When the zoom switch 72 is operated, the system control unit 50 starts electronic zoom processing. In electronic zooming, a part of the area in the image formed on the image sensor 14 is clipped by the image processing unit 20, and enlargement processing by pixel interpolation and the like or reduction processing by thinning and the like is performed. Then, compression is performed using the compression/decompression unit 32, and the compressed data is recorded in the recording unit 202 as a still image so that a zoom effect is obtained. Further, based on operation of the zoom switch 72, the recording angle of view is changed by increasing or decreasing the area clipped from the image formed on the image sensor 14 by the image processing unit 20. An imaging apparatus is capable of easily framing at that stage a rapidly moving object regardless of the zoom magnification without any troublesome operations by controlling the electronic viewfinder display of the image display unit 28 in the following manner.

First, in step S601, the system control unit 50 checks the state of the zoom switch 72. If the tele switch is ON, the processing proceeds to step S602. In step S602, the angle of view is changed to the telephoto side by reducing the recording area, namely, the clipped area of the image by the image processing unit 20 during recording, and increasing the electronic zoom magnification. On the other hand, if the wide switch is ON, the processing proceeds from step S601 to step S603. In step S603, the angle of view is changed to the wide angle side by increasing the recording area, namely, the clipped area of the image by the image processing unit 20 during recording, and decreasing the electronic zoom magnification.

Next, in step S604, the system control unit 50 performs face detection processing on the image data for display which was read into the image display memory 24. Based on the result of the face detection processing, face information such as the presence of a face, the number of faces, the size (width and height) and position coordinates of each face, and a reliability coefficient are obtained. This face detection processing will be described below using FIG. 7.

Next, in step S605, the system control unit 50 determines whether a face was detected in the face detection processing of step S604. If it is determined that a face was not detected (NO in step S605), the processing proceeds to step S607, and normal view display is performed. In normal view display, only the recording area which is a part of the image formed on the image sensor 14 is displayed on the image display unit 28. More specifically, the display area displayed on the image display unit 28 is set to be the same area as the recording area.

Further, if it is determined in step S605 that a face was detected (YES in step S605), the processing proceeds to step S606. In step S606, the system control unit 50 determines whether the size of the detected face is equal to or greater than a predetermined size, for example, 70% of the screen. The predetermined size may be set to be an appropriate size which makes framing easy regardless of the size of the face with respect to the screen. If it is determined that the size of the face is equal to or greater than the predetermined size (YES in step S606), the processing proceeds to step S608, and wide view display is performed. In wide view display, not only the recording area which is a part of the image formed on the image sensor 14, but the peripheral portion of that image is also displayed on the image display unit 28. More specifically, the display area displayed on the image display unit 28 is set to be a wider area than the recording area.

By thus setting to a wide view display, it becomes comparatively easy to track a rapidly moving object so that it can be captured in the photographing range. Further, a frame indicating the recording area is displayed on the display unit 54 so that the user can recognize the recording area.

Further, if it is determined in step S606 that the size of the face is not equal to or greater than the predetermined size (NO in step S606), the processing proceeds to step S607. In step S607, normal view display is performed.

By processing in the above manner, the imaging apparatus can be switched to wide view when the main object is large with respect to the screen and may quickly be lost from view, and switched to normal view when the main object is small with respect to the screen and it is easy to continue to capture the object. Consequently, a display which can be easily framed is made without any troublesome operations.

Next, in step S609, the system control unit 50 determines whether the electronic zoom is at a maximum magnification. If it is determined that the electronic zoom is at a maximum magnification (YES in step S609), the system control unit 50 finishes the electronic zoom processing. If it is determined that the electronic zoom is not at a maximum magnification (NO in step S609), the processing proceeds from step S609 to step S610. In step S610, the system control unit 50 determines whether the electronic zoom is at one-fold magnification, namely, whether there is no electronic zooming. If it is determined that the electronic zoom is at one-fold magnification (YES in step S610), the system control unit 50 finishes the electronic zoom processing.

Further, if it is determined in step S610 that the electronic zoom is not at one-fold magnification (NO in step S610), the processing proceeds to step S611. In step S611, the system control unit 50 checks the state of the zoom switch 72. If it is determined that the zoom switch 72 is OFF (YES in step S611), the system control unit 50 finishes the electronic zoom processing. If it is determined that the zoom switch 72 is ON (NO in step S611), the processing returns to step S601, and the same operations are repeated.

Although face detection is used as the exemplary means for detecting the main object in the present embodiments, the present invention is not limited to only face detection. For example, an area designated by the user using a touch panel may be detected as the main object, or the main object may be set by detecting a moving body based on information about difference from the image of the previous frame. Further, while the electronic zooming was described as an example, the present invention may also be applied to optical zoom operations during electronic tele conversion.

Next, the face detection processing in step S604 of FIG. 6 will be described in more detail using the flowchart illustrated in FIG. 7.

First, in step S701, the system control unit 50 sends image data about a face detection target to the image processing unit 20. Then, in step S702, the system control unit 50 controls the image processing unit 20 to perform horizontal band pass filtering on the image data. Next, in step S703, the system control unit 50 controls the image processing unit 20 to perform vertical band pass filtering on the image data processed in step S702. Based on the horizontal band pass filtering and the vertical band pass filtering, an edge component is detected from the image data.

Next, in step S704, the system control unit 50 performs pattern matching on the detected edge component, and extracts eye, nose, mouth, and ear candidate groups. Then, in step S705, the system control unit 50 narrows down the eye candidate group to only those candidates which have a pair of eyes by determining that candidates which satisfy a pre-set condition (e.g., distance and angle etc. between two eyes) from among the eye candidate group extracted in step S704 are a pair of eyes.

Next, in step S706, the system control unit 50 detects a face by associating the eye candidate group narrowed down in step S705 with its corresponding other parts (nose, mouth, ears) forming the face, or by passing the eye candidate group through a pre-set non-face condition filter. In step S707, the system control unit 50 outputs the above face information based on the face detection result obtained in step S706, and finishes the processing. At this stage, feature quantity, such as the number of faces, is stored in the memory 52.

The imaging apparatus according to the above-described second exemplary embodiment has a first mode (normal view) in which the same area as a clipped recording area is displayed on the image display unit 28 as a display area, in an electronic zoom state or an electronic tele conversion state which records by clipping a part of the imaging area. Further, this imaging apparatus has a second mode (wide view) in which an area wider than the clipped recording area is displayed on the image display unit 28 as the display area. In addition, the imaging apparatus has a unit which detects a main object in the screen (in the second exemplary embodiment, face detection), and calculates the size of the main object (face) in that screen.

Further, the imaging apparatus according to the second exemplary embodiment switches between the first and second display modes based on whether the calculated main object size is equal to or greater than a predetermined main object size (whether the face size is equal to or greater than a predetermined magnification). More specifically, when the main object size is a high magnification which is equal to or greater than the predetermined main object size, the imaging apparatus switches to the second mode (wide view), and when the main object size is a low magnification which is less than the predetermined main object size, the imaging apparatus cancels the wide view and switches to the first mode (normal view).

Therefore, similar to the first exemplary embodiment, an easy-to-use imaging apparatus can be provided which is capable of performing a display which can be easily framed regardless of zoom magnification, without any troublesome operations.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   an imaging unit configured to capture an image of an object;
   a display unit configured to display the captured image; and
   a control unit having two display modes in a zoom state where an image of a part of an imaging area of the imaging unit is recorded, wherein a first display mode in which a first image is displayed and a second image is not displayed on the display unit and a second display mode in which the second image is displayed and the first image is not displayed on the display unit,
   wherein the control unit is configured to switch to the first display mode when the control unit determines that a zoom magnification is less than a predetermined zoom magnification and switch to the second display mode when the control unit determines that the zoom magnification is equal to or greater than the predetermined zoom magnification, and
   wherein the first image is an image of a recording area, of which an image is to be recorded, in the captured image and the second image is an image of an area wider than the recording area in the captured image.

2. The apparatus according to claim 1, wherein in the second display mode, the display unit displays a frame indicating the recording area on the second image.

3. The apparatus according to claim 1, wherein in the second display mode, the display unit displays the recording area in a recognizable way on the second image.

4. An apparatus comprising:
   an imaging unit configured to capture an image;
   a display unit configured to display the captured image;
   a detection unit configured to detect an object region including an object on a screen; and
   a control unit configured to switch a first display mode and a second display mode where an image of a part of an imaging area is recorded, wherein
   in the first display mode, an image of a recording area, of which an image is to be recorded, is displayed on the display unit, and in the second display mode, an image of an area wider than the recording area is displayed on the display unit, and
   the control unit is configured to switch to the first display mode in a case where the calculated object size is smaller than a predetermined object size and switch to the second display mode in a case where the calculated object size is equal to or greater than the predetermined object size.

5. The apparatus according to claim 4, wherein the detection unit is a face detection unit.

6. The apparatus according to claim 4, wherein in the second display mode, the display unit displays a frame indicating the recording area.

7. The apparatus according to claim 4, wherein in the second display mode, the display unit displays the recording area in a recognizable way.

8. The apparatus according to claim 4, wherein in the first display mode, the display unit displays an image of only the recording area of all imaging area.

9. A method comprising:
   capturing an image;
   detecting an object region including an object on a screen; and
   switching to a first display mode and a second display mode where an image of a part of an imaging area is recorded, wherein in the first display mode, an image of a recording area, of which an image is to be recorded, is displayed on a display unit, and in the second display mode, an image of an area wider than the clipped recording area is displayed, and
   wherein the switching to the first display mode is operated in a case where the object size is smaller than a predetermined object size and the switching to the second display mode is operated in a case where the calculated object size is equal to or greater than the predetermined object size.

10. A method comprising:
    capturing an image of an object; and in a zoom state where an image of a part of an imaging area is recorded, switching to a first display mode which displays a first image and does not display a second image on the display unit in a case of determining that a zoom magnification is less than a predetermined zoom magnification, and switching to a second display mode which displays the second image and does not display the first image on the display unit in a case of determining that the zoom magnification is equal to or greater than the predetermined zoom magnification, the switching of the first and the second display mode being operated in the zoom state, wherein the first image is an image of a recording area, of which an image is to be recorded, in the captured image and the second image is an image of an area wider than the recording area in the captured image.

* * * * *